Feb. 25, 1958 F. E. BROWN 2,824,361
MACHINE FOR ASSEMBLING HYPODERMIC SYRINGES
Filed Sept. 13, 1954 6 Sheets-Sheet 1

INVENTOR.
FRANK E. BROWN
BY
HIS ATTORNEYS

Feb. 25, 1958  F. E. BROWN  2,824,361
MACHINE FOR ASSEMBLING HYPODERMIC SYRINGES
Filed Sept. 13, 1954  6 Sheets-Sheet 2

Fig. 3

INVENTOR.
FRANK E. BROWN
BY
HIS ATTORNEYS

Feb. 25, 1958 F. E. BROWN 2,824,361
MACHINE FOR ASSEMBLING HYPODERMIC SYRINGES
Filed Sept. 13, 1954 6 Sheets-Sheet 3

INVENTOR.
FRANK E. BROWN
BY
HIS ATTORNEYS

United States Patent Office 2,824,361
Patented Feb. 25, 1958

2,824,361

MACHINE FOR ASSEMBLING HYPODERMIC SYRINGES

Frank E. Brown, Burbank, Calif., assignor to Chas. Pfizer & Co., Inc., Brooklyn, N. Y., a corporation of Delaware Application September 13, 1954, Serial No. 455,565

4 Claims. (Cl. 29—211)

This invention relates to a machine for assembling hypodermic syringes, and more particularly, to the orientation and insertion of resilient plungers into cylindrical containers, such as glass hypodermic syringe vials and the like. The invention is especially concerned with the provision of a machine which is capable of performing these operations on a fully automatic basis.

While a wide variety of hypodermic syringes are known in the art and extensively used in administering medicaments, many of the operations associated with the assembly, filling and sealing of these syringes are even to this day performed by hand. In some instances these operations have been partially mechanized in the pharmaceutical industry, but complete mechanization has not heretofore been achieved on a practical or economical basis. The greatest difficulties in this respect have been encountered in the orientation and conveyance of the many delicate or complex parts which go into the assembly of such devices and in maintaining the necessary conditions of sterility during their assembly.

To meet this problem, a fully automatic machine for assembling, filling and sealing hypodermic syringe vials and attaching needles thereto is described and claimed in my copending application Serial No. 455,564, filed September 13, 1954 which has currently issued as U. S. Letters Patent 2,765,606. This machine is particularly adapted to produce a syringe cartridge and needle assembly as described in my copending application Serial No. 264,992, filed January 4, 1952 which has currently issued as U. S. Letters Patent 2,737,949. The assembly shown therein comprises a cylindrical container or vial, preferably of glass, having a reduced neck portion termination in an annular lip, a flanged stopper in the neck portion, a ferrule retaining the stopper therewithin, a protected needle carried by the stopper and ferrule, and a plunger in the other end of the cylinder. This plunger is a conventional type consisting of a cylindrical body of resilient material, such as rubber, provided with circumferential ribs about the outer periphery thereof and further provided with a threaded stud imbedded in one end to facilitate attachment of an elongated actuating plunger thereto. Since the resilient plungers serve in part as stoppers for the medicament in the vials, they are referred to herein as "plunger stoppers."

The feeding, orientation and insertion of these plunger stoppers into hypodermic syringe vials is but one phase of the problem of assembling such devices, although it is unquestionably an important phase. It is in fact complicated by a number of difficulties peculiar to the handling of resilient materials, of which the plunger stoppers are constructed. Moreover, the problem of orientation is itself a difficult one in view of the fact that the usual hypodermic syringe plunger stopper is small in size and is delivered to the machine at random.

The orientation and insertion of plunger stoppers in accordance with the present invention may best be understood by reference to the accompanying drawings and the descriptive matter relating thereto. With reference to the drawings.

Figure 1:
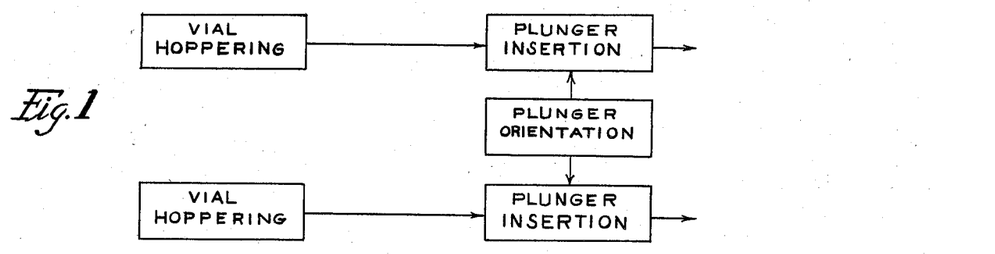
Fig. 1 is a block diagram depicting the various operations performed in a machine forming a preferred embodiment of the invention.

As indicated above, Fig. 1 shows the various operations performed in accordance with a preferred embodiment of the present invention. In essence, the machine consists of two assembly lines, each of which is fed glass hypodermic syringe vials from a vial hoppering mechanism, and resilient plunger stoppers from a plunger stopper orientation mechanism. Advantageously, separate vial hoppering mechanisms are employed for this purpose, while one plunger stopper orientation mechanism is employed, the latter dividing the plunger stoppers between the two assembly lines on the basis of their orientation. Of course, a single orientation mechanism could also be employed for each assembly line, as will later be apparent.

GENERAL DESCRIPTION OF THE MACHINE

Figures 2, 4:
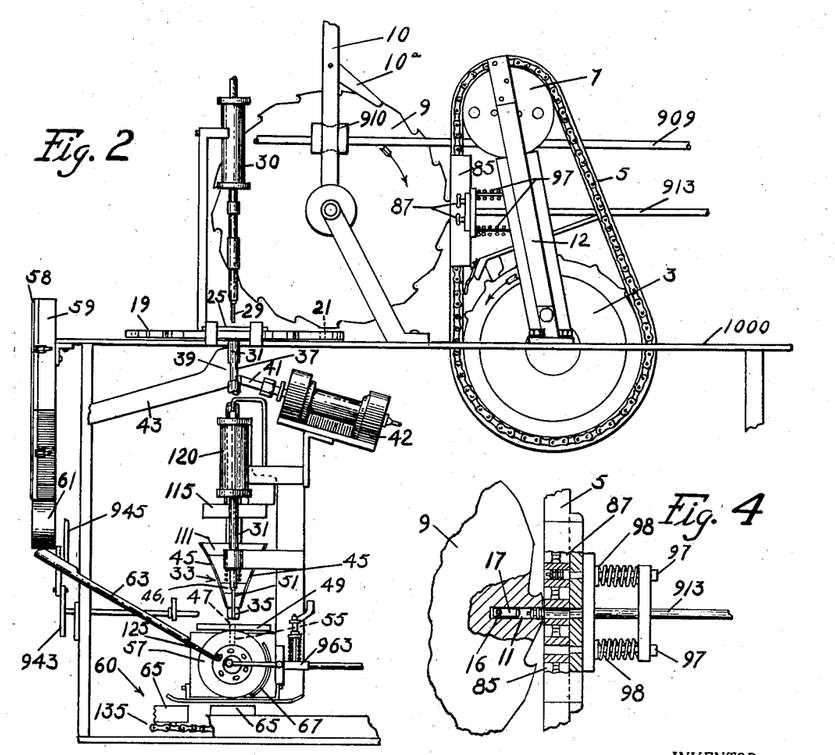
Fig. 2 is a partial side elevation view illustrating the major components of the machine for performing the various feeding and assembling operations.
Fig. 4 is a fragmentary view, partly in section, illustrating a detail of the machine.
Figure 3:
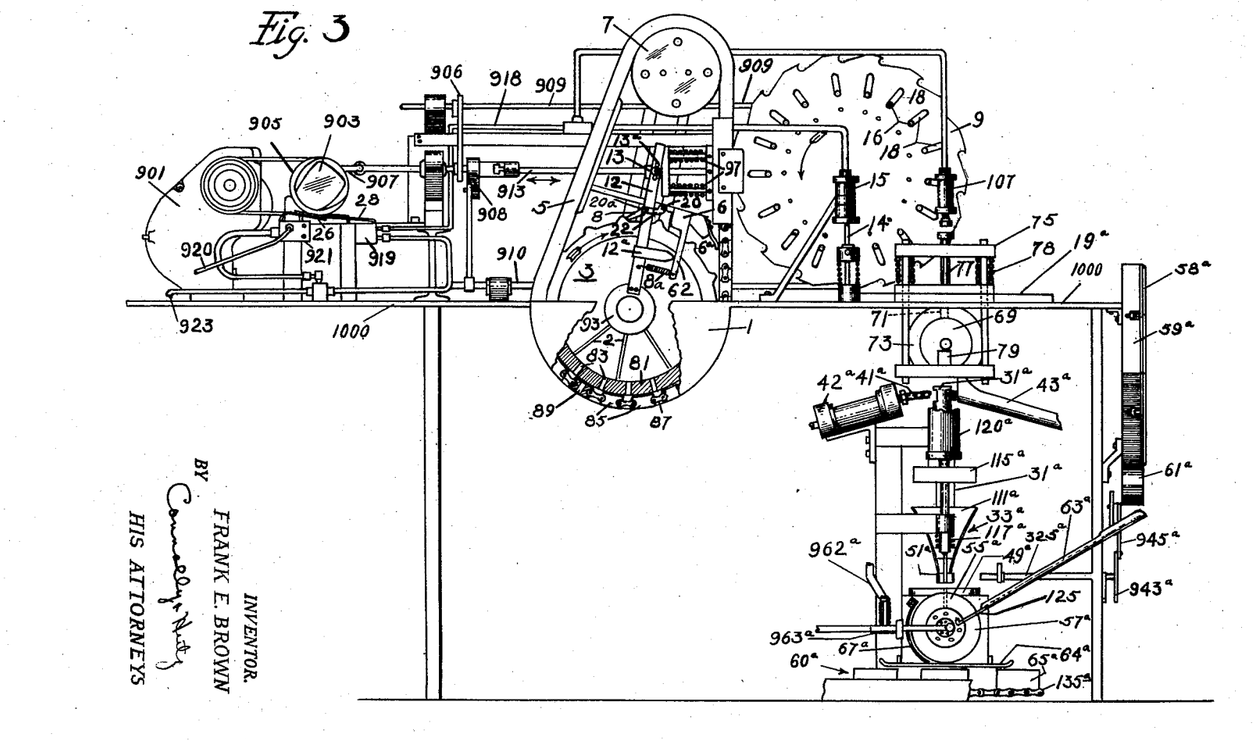
Fig. 3 is a similar side elevation view illustrating the major components of the machine of Fig. 2 from the other side.
Figure 5:
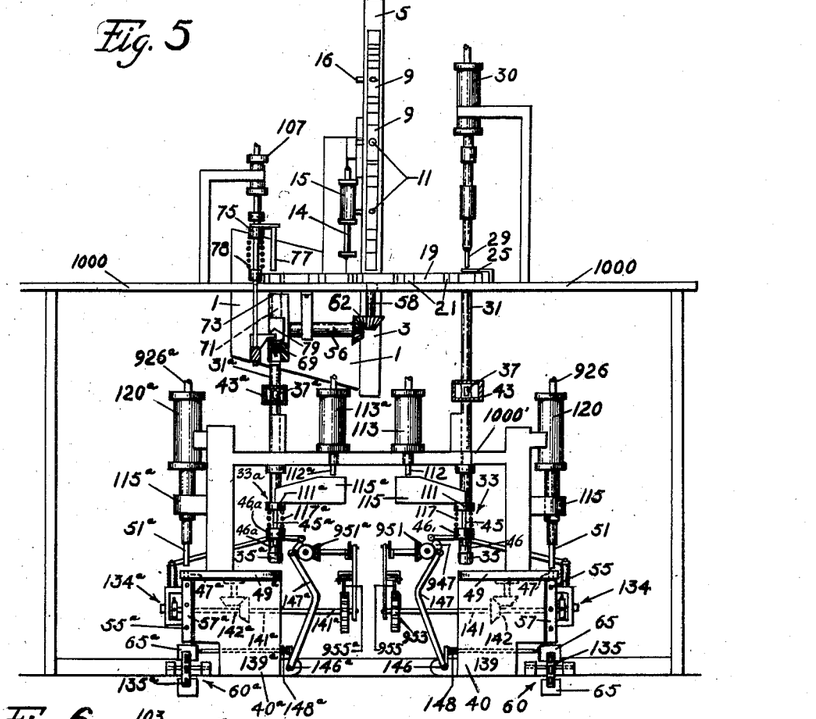
Fig. 5 is a front elevation view of the machine with the vial feeding structure removed.

The machine for performing these operations is more particularly shown in the views of Figs. 2, 3, 5 and 9. Considering the assembly line of Fig. 2 for the moment, the plunger stoppers are introduced at random to a plunger hopper 1, in which they are agitated by a series of fingers 2 as shown in Fig. 3. The end of this hopper is provided with a rotating, vertical wheel 3, having a covered chain conveyor 5 extending about its outer periphery and about an idler 7, for receiving the plungers and transporting them to a further station. This chain conveyor picks up the plunger stoppers in pockets provided therein and conveys them in random orientation to a vertical transfer wheel 9 provided with radial pockets 11 in its outer periphery, as shown in Fig. 5. Conveyor 5 and transfer wheel 9 are both intermittently rotated in synchronization, wheel 9 being actuated by rocker arm 10 and pawl 10a operating against teeth on its outer periphery, while conveyor 5 is actuated by rocker arm 12 and pawl 8 operating against teeth on wheel 3. This permits a reciprocating piston or rod 913 to force the plunger stoppers from the pockets of the conveyor into the corresponding pockets 11 of the transfer wheel.

The plunger stoppers are retained in the pockets of the transfer wheel 9 until the wheel reaches a position tangential to a horizontal orientation wheel 19, at which point they are ejected by a pneumatically operated reciprocating plunger 14 actuated by a pneumatic device 15 and operating against a pin 16 on an ejector piston 17 contained in each of the radial pockets 11, as shown in Fig. 4. Pins 16 project through slots 18 in the outer face of wheel 9 for this purpose. The plunger stoppers are at the same time introduced to lateral pockets 21 near the outer periphery of horizontal orientation wheel 19. To accomplish this, horizontal orientation wheel 19 is, of course, intermittently rotated in synchronization with transfer wheel 9 by a drive mechanism shown more particularly in Fig. 13 to be later described. A stationary plate 23 (Fig. 6) preferably is provided above a common support 1000 for the machine to retain the plungers in the pockets 21 while the orientation wheel 19 is rotated, or the common support may itself be used for this purpose. Upon being introduced to this wheel, the plunger stoppers are still oriented at random, some of them having their studs pointed up and some having their studs pointed down.

Accordingly it is necessary that there be some device for selecting plungers having the desired orientation. This selecting device will be more readily understood by reference to Figs. 6 to 8 inclusive of the drawings. In order to separate one from the other, the thickness of wheel 19 in relation to the length of the plunger stoppers is such that those stoppers having their studs pointed up will be completely received by the pockets 21 of the orientation wheel, except for the studs, while those having their studs pointed down will project slightly above the upper face of wheel 19, leaving at least the end ribs of such plunger stoppers exposed. This condition facilitates the desired separation or sorting, which is accomplished through a pair of blades 25, suspended above wheel 18 to engage those plunger stoppers which are projecting from its upper face. As shown the plate 23 and support 1000 are provided with a hole 27, in alignment with pockets 21 of the rotating orientation wheel, so that those plunger stoppers which are properly oriented for insertion into syringe vials, i. e. the ones which are completely received by wheel 19, may drop through plate 1000. A lightly loaded reciprocating piston 29, actuated by a pneumatic device 30, is provided to insure against sticking of any such plungers within the pockets 21 or hole 27. The plungers which are projecting above the face of orientation wheel 19 are engaged by the blades 25 and retained thereby until they progress past hole 27 to prevent them from dropping therethrough. The plungers retained in wheel 19 are delivered to a point 180° away where a second fluid pressure servomotor unit 107 (see Fig. 6) ejects them to a separate assembly line which will be hereinafter described.

Figure 9:
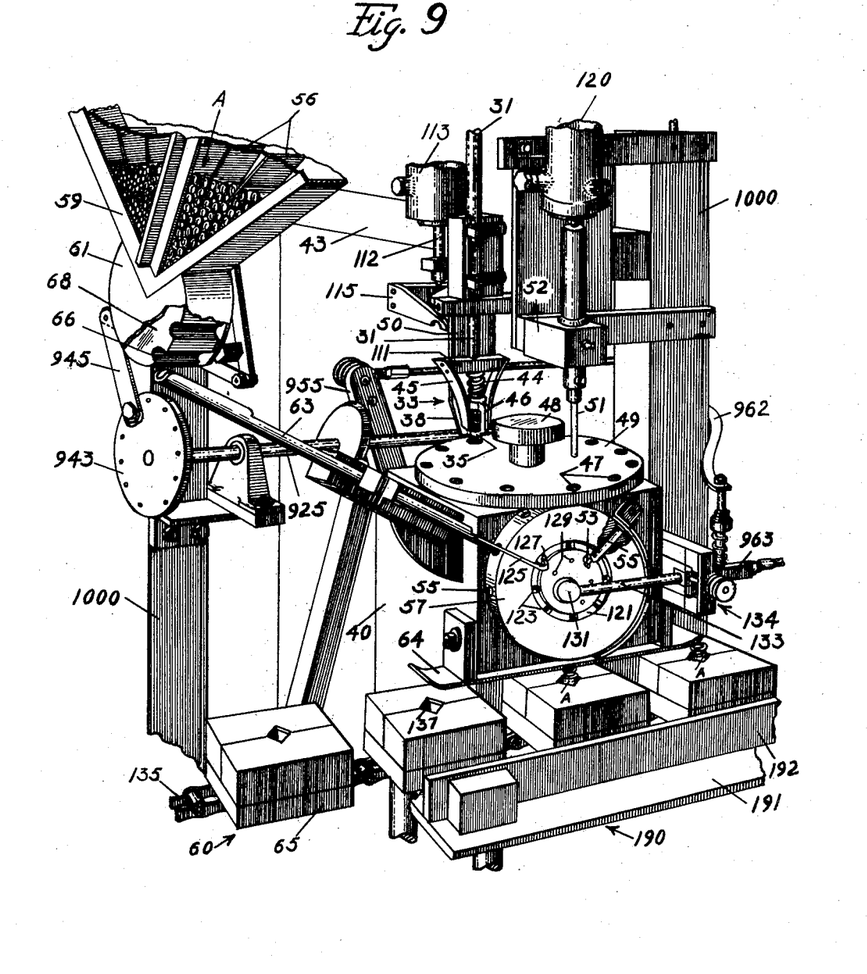
Fig. 9 is a perspective view illustrating the mechanism for operatively assembling the plunger stoppers into the glass vials.

The unidirectionally aligned plunger stoppers passing through hole 27 are guided to the plunger insertion mechanism through a tube or chute 31, the base of which is provided with a plunger ejector mechanism generally indicated at 33 in Figs. 2, 5 and 9. The end of this mechanism is provided with a restriction 35 integral with a radially offset arm 46 which in cooperation with an opposing guide plate 38 retains a column of plungers within tube 31 under normal conditions of operation. To prevent the plungers from jamming within the tube 31, an overflow is arranged in its upper portion by providing a pair of aligned holes, 37 and 39 (see Fig. 2), through which a reciprocating plunger 41 actuated by a pneumatic cylinder 42, continuously removes all plungers collecting at the level of these holes. The plungers so removed pass from hole 37 into a discharge chute 43, from which they may be recovered.

The plunger stoppers are individually ejected from the base of tube 31 by means of resilient fingers 45, which reciprocate and urge the bottom plunger through the restriction 35 and into pockets 47 of a horizontal plunger positioning wheel 49. Normally the yoke 111 is maintained in an upper, non-ejecting position by means of a spring 44. When yoke 111 is in the upper position the fingers 45 are held apart by the enlarged upper portion $46_1$ of arm 46. When the yoke 111 is driven downward by arm 115 the fingers 45 move together to contact the lowermost plunger held by arm 46 to cause the lowermost plunger to be pushed through restriction 35 and deposited within a hole 47 in wheel 49. The yoke 111 is pushed downward by arm 115 which is actuated by plunger 112 which is reciprocated by cylinder 113, as later described on page 13 relating to "Details of the Plunger Stopper Insertion Mechanism."

After transfer to wheel 49, the plunger stoppers are rotated until situated beneath a reciprocating plunger 51, as shown in Figs. 5 and 9. This plunger forces the plunger stoppers through wheel 49 and into the open large end vials carried within radial pockets 55 in vial supporting wheel 57. The vials in turn are fed to this wheel from a vial hopper 59 through a star wheel 68 and chute 63 leading to the vial wheel. The ejector mechanism 33, vial wheel 57 and star wheel 68 are all synchronized together for intermittent operation.

After insertion of the plungers within the vials, the vials are rotated and delivered from the vial wheel 57 to a conveyor 60 comprising a series of spring-loaded clamp blocks 65. Between insertion of the plunger stoppers into the vials and delivery to these blocks, the vials are retained in the vial wheel by means of an arcuate guard 67 about the outer periphery of wheel 57. Blocks 65 are advantageously constructed of laminated phenolic resin, such as "Micarta," but other materials can, of course, be employed in lieu thereof. The clamp blocks are forced open when positioned immediately beneath the vial wheel by means of a control mechanism 139, 147 (Fig. 5) operating against the springs thereon to open the clamping elements. After passing this point, the vials are rigidly supported by the blocks for further operations to be performed at succeeding stations. Alternatively, the vials may be supported by turntables, other types of conveyors and the like, upon being discharged from the vial wheel, as will be understood by those skilled in the art.

A particular feature of the present invention is the innovation that a single, common orientation mechanism feeds the plunger stoppers to both assembly lines 60 and 60a. Thus, the same hoppering and transferring mechanism including all components up to wheel 19 feeds stoppers to both assembly lines 60 and 60a. However, the plungers which pass through the sorting blades 25 associated with wheel 19 without dropping through hole 27, are in an inverted position and must again be inverted before insertion into the vials on assembly line 60a of Figs. 3 and 5. This is accomplished through an inversion wheel 69 (see Figs. 3 and 5) cooperating with the pockets in orientation wheel 19 and provided with pockets 71 in an annular rim 73 extending laterally from one face thereof. A reciprocating yoke 75 provided with plungers 77 and 79 transfers plunger stoppers to and from the inversion wheel. Plunger 77 removes the plunger stoppers from wheel 19, forcing them into the pockets 71 of the inversion wheel, while plunger 79 removes them from such pockets after they have been inverted. At this point the plungers are properly oriented for insertion and pass through a tube 31a for insertion into the vials by means identically with that described in connection with the first assembly line 60 of Fig. 2.

The above description is a general resume of the several cooperatively associated components of the present machine. To clarify further details, reference is made to Figs. 2 to 5 inclusive showing the mechanism for hoppering the plunger stoppers and introducing them to the horizontal orientation wheel 19.

Details of the plunger stopper hoppering and orienting mechanism

As previously pointed out, the end of hopper 1 is provided with a rotating wheel 3 about which a chain conveyor 5 is revolved for the purpose of picking up the plunger stoppers from within the hopper. This is accomplished in part, as shown most clearly in Fig. 3, by providing wheel 3 with an annular rim 81 having a series of radial passages 83 therethrough which traverse a circular path parallel with that of the chain conveyor. Chain conveyor 5 consists of a series of small blocks 85 provided with pockets 89 and linked by conventional chain linkages 87, for the purpose of receiving plungers which drop through the passages 83 and into the pockets of blocks 85 as wheel 3 traverses the base of the hopper. To facilitate this action, the plunger stoppers are agitated within the hopper by means of rods or fingers 2 attached to oscillating and reciprocating ring 93 supported by a rocker arm 12. Rocker arm 12 is in turn pivotally connected at 20a to a bracket 22 pivotally conected at 20 to a cross bar 6 fixedly carried by the cover of chain 5. Bar 6 includes a depending arm 6a to which one end of a biasing spring 8a is attached, the other end of the spring being connected to the rocker arm 12. The rocker arm further includes a laterally projecting shoulder or cam 12a which is adapted to bear against and slide on arm 6a. In addition, rocker arm 12 includes a slot 13a at its upper end for slidably receiving a pin carried by a slide block 13 fixedly carried on actuator rod 913.

The arrangement is such that reciprocating rod 913 will move the upper end of rocker arm 12 about pivot 20 to oscillate ring 93. At the same time, the action and relative positions of spring 8a and cam 122 impart an axially translating movement to the rocker arm and fingers 2. This causes the fingers to project into the holes 83 in rim 81 and ejects the plunger stoppers. The plungers thus progress from the base of the hopper 1 through rim 81 of wheel 3 to the pockets in the conveyor 5 and about idler 7, until ejected from the conveyor by the reciprocating rod 913 and forced into the pockets 11 of vertical transfer wheel 9, as shown more particularly in Fig. 4. The plunger transfer rod 913 is advantageously provided with a pair of inter-connected, spring loaded feelers 97, which insure proper alignment of the plungers for insertion into wheel 9. The feelers are normally retained in a retracted position by spring 98. Rod 913 is mechanically actuated, as hereinafter more particularly described, but pneumatic or electrical means may also be employed for this purpose.

As previously pointed out, each of the pockets 11 within wheel 9 is provided with a loosely fitting piston 17, see Fig. 4, having a pin 16 projecting through slots 18 (Fig. 3) in the face of the wheel. This construction facilitates removal of the plunger stoppers from the pockets 11 in which they are snugly contained. Such removal takes place after wheel 9 has rotated 90° from the point of plunger stopper insertion therein and it is accomplished by means of a pneumatically operated plunger 14 acting upon pin 16 and forcing the plunger stoppers from their pockets into the corresponding pockets of orientation wheel 19.

Figures 6, 7:
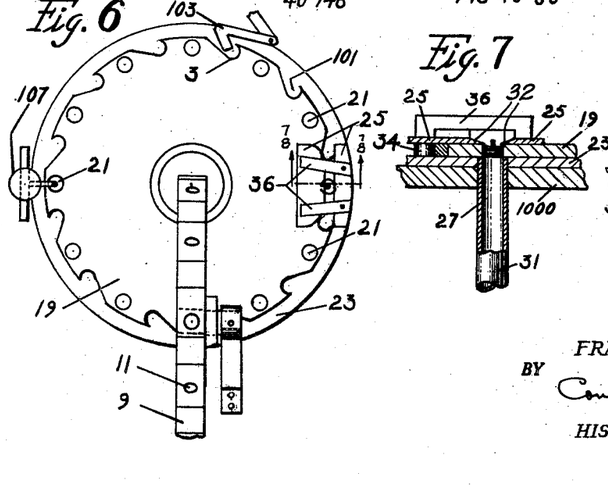
Fig. 6 is a top plan view of part of the plunger stopper orientation mechanism of the machine.
Figs. 7 and 8 are fragmentary sectional views along the line 7—7, 8—8 of Fig. 6.
Figure 8:
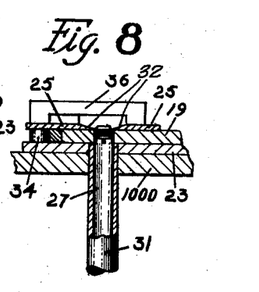

While the orientation wheel is partially shown in Figs. 2, 3 and 5, its construction and that of the sorting mechanism are better shown in Figs. 6, 7 and 8. In the plan view of Fig. 6 the orientation wheel is rotated clockwise in a step by step manner reciprocating pawl 103 engaging tooth-like indentations 101 in its outer periphery of the wheel. Rotation of the wheel moves the plunger stoppers between the horizontal blades 25. A stationary bearing plate 23 is preferably provided beneath wheel 19 to retain the stoppers in the wheel. Blades 25 are rigidly attached with respect to plate 23 and support 1000 above which wheel 19 rotates, by means of legs 34 between the outer blade and plate 23. A pair of spacer bars 36 connect the blades to each other. The blades are maintained in contact with the upper face of wheel 19 and are preferably bevelled as shown at 32 (see Figs. 7 and 8) to facilitate retention of all plunger stoppers which contact them in the position illustrated by Fig. 8. More specifically, the plungers which are positioned as in Fig. 7 are not so retained and drop through tube 31, whereas those positioned as in Fig. 8 are retained by blades 25 and continue to move with orientation wheel 19 to a position opposite the sorting blades and above inversion wheel 69.

It will be recalled that the plungers which are positioned with the studs pointed down within the pockets of orientation wheel 19 have all passed the sorting blades 25 and are transported to the side of the machine shown in Fig. 3. Such plungers are removed from orientation wheel 19 by means of a knockout pin or rod 77 carried by yoke 75 and introduced into the pockets 71 of inversion wheel 69 at the top thereof. As pointed out, a second pin 79 (shown best in Fig. 5) which removes them from these pockets after they have been inverted to the proper position, is also fixedly attached to the yoke 75. The entire yoke is slidably supported on support 1000 and is reciprocated by a common actuating means such as a pneumatically operated servo-motor 107 carried by the common support 1000. Springs 78 are provided to return the yoke and knockout pins to a retracted condition while orientation wheel 19 and inversion wheel 69 are in rotation. Rotation of inversion wheel 69 is obtained by means of gearing 62 connected between a shaft 56 extending from the inversion wheel and a shaft 58 which rotatably journals wheel 19 in the support 1000. The arrangement is such that movement of wheel 19 via pawl 103 turns wheel 69 in synchronized relationship through gearing 62. The plunger stoppers ejected from inversion wheel 69 by plunger 79 are delivered to a vertical chute 31a from which they proceed to a plunger stopper insertion mechanism for conveyor line 60a (see Figs. 3 and 5) which is identical to that for line 60 (see Figs. 2, 5 and 9).

Details of the plunger stopper insertion mechanism

Since the mechanisms for each of the conveyor lines are identical from this point, particular reference will be made only to the structure shown in Figs. 2, 5 and 9. As described previously, the oriented plungers proceed in chute 31, passing the overflow unit 37, 43 (Fig. 2) to an ejection mechanism 33 at the base of the chute wherein they are retained by restriction 35. As can be seen by reference to Fig. 9, tube 31 terminates above restriction 35 in an offset arm 46 which is internally connected to the latter. An elongated bent strip or arm 38 depends from a sub-support 50 and with arm 46 form slot-like access openings adjacent the fingers 45. The plungers are individually ejected from restriction 35 by reason of the spring fingers 45 and projecting between arms 38 and operating against the lowermost plunger in the device. The spring fingers are attached to a yoke 111 which reciprocates on chute 31 and is stabilized by support 50. The yoke is actuated by a reciprocating plunger 112 through a pneumatic servomotor 113 connected to move a second yoke 115 against the yoke 111. The spring fingers 45 are returned to a static position by means of a spring 44 positioned above arm 46 and operating against yoke 111. Movement of pneumatic cylinder 113 and fingers 45 is synchronized with the intermittent rotation of the plunger positioning wheel 49 to facilitate insertion of the plunger stoppers into the pockets 47 of the positioning wheel. The plunger stoppers are then rotated to a position beneath the insertion plunger 51 of servomotor 120. The plunger 51 has a central recessed aperture (not illustrated) to receive the studs of the plunger stoppers and steady them as they are forced from the wheel 49 into the vials contained in wheel 57. Plunger 51 and motor 120 are supported by brackets 52 on main support 1000 and are operated in synchronization with wheel 49 through control of the actuating motor 120 in a manner more fully described hereinafter.

Details of the vial feeding and transferring mechanism

The glass vials into which the plunger stoppers are inserted are supplied to the transfer or vial wheel 57 from a simplified storage arrangement which facilitates rapid replenishment and promotes sterile conditions. As heretofore explained, the machine of the invention employs dual assembly lines and it has been found most desirable to incorporate a separate storage and feeding arrangement for supplying glass vials to the respective lines. This arrangement will be more readily understood by reference to Figs. 1, 2, 3 and 9 of the drawings in which the vial supply units are illustrated as comprising dual box or tray-like cabinets 59, 59a of identical rectangular form and vertically mounted on the main support unit 1000 by conventional bracket members. In a preferred form of the invention, the cabinets 59, 59a are made of stainless steel and are provided with an integral depending housing 61, 61a at one corner, which housing is in open communication with the interior of the cabinet. The cabinets are adapted to support a plurality of glass vials A, as shown in Fig. 9, in stacked array with each vial being oriented to have its large open end directed outwardly towards a removable cover member 58, 58a. With this arrangement, as will be more readily understood by reference to Fig. 9 the vials are automatically gravity fed towards the lower corner and housing 61, assisted by a plurality of spaced guide vanes 56, where the vials are individually received in pockets 66 of a star or Geneva transfer wheel 68. Wheel 68 is in turn actuated in a step-by-step manner to sequentially move the vials to a position opposite a feed chute 63, at which point, the vials discharge through an opening (not illustrated) in the housing 61. The vials are received in the chute 63 with the large open end pointed away from wheel 57, and move down the chute into radial pockets 55 in the outer periphery of the vial wheel.

The face of the vial transfer wheel 57 is provided with an annular depression 121 near the base of pockets 55 to expose a portion of each pocket or passage through holes 123, as shown in the figure. The purpose of this construction is to permit cushioning of the glass vials as they leave the vial feed chute 63 and enter pockets 55 to minimize breakage of the vials. For this purpose, chute 63 is provided with an extension 125 having radially inwardly projecting resilient tip member 127, partially extending within the radial passages 55 through the holes 123. The vials which leave chute 63 thus engage projection 127 before hitting the base of each passage, and under normal conditions of use will be cushioned and prevented from breaking.

However, a limited amount of breakage may nevertheless be encountered due to defective vials which may proceed undetected to the vial wheel 57. For this reason a series of holes 129 are connected via passageways 53 with the base of each pocket 55. A jet of compressed air is adapted to be delivered through holes 129 and passageways 53 to the pockets from a stationary air-head 131 as rotation of wheel 57 moves each hole 129 into registry with the head. The head 131 is supported by a conduit 133 carried in a clamp unit 134. Any broken glass which would not normally fall from pockets 55 as each pocket leaves guide 67 is thus removed by a jet of compressed air directed to the base of the pockets after a few more degrees of rotation. The air supplied through conduit 133 to head 131 is controlled by a normally closed valve 963 actuated by an arm 133 in synchronism with movements of the vial wheel (see Figs. 9 and 14).

Figure 14:
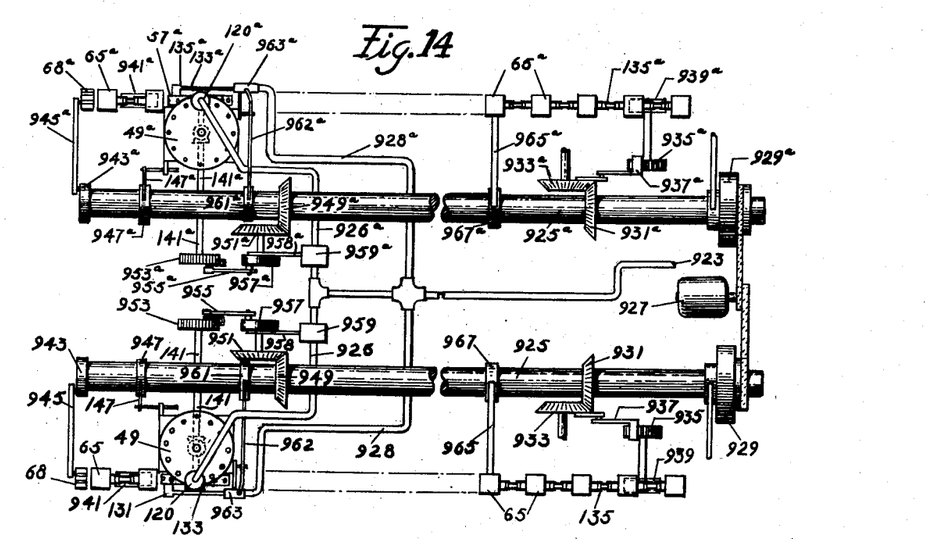
Fig. 14 is a schematic view illustrating the drive and control mechanism for the vial feeding and positioning and the plunger stopper inserting mechanisms.

The vials received by the vial wheel are moved to a position directly beneath plunger rod 51 where the plunger stoppers are then inserted from horizontal positioning wheel 49. Movement of wheel 49 is synchronized with movement of vial wheel 57 through a common drive shaft 141 and gearing 142 as shown in Figs. 5 and 14. Shaft 141 is intermittently rotated by means of a ratchet wheel 953 and driving pawl 955 as more fully explained hereinafter. As indicated above, the vials are retained in the rotating vial wheel after insertion of the plunger stoppers by means of an arcuate guard member 67 extending about a portion of wheel 57. Since the plunger stoppers are inserted into the large open end or base of each vial, the vials are inverted by rotation of wheel 57, before being delivered to conveyor blocks 65 to present the smaller flanged end in exposed position, as shown in Fig. 9, in readiness for further operations such as filling and closing at remote stations (not illustrated). Preferably, a stabilizing guide member 64 is carried by the casing 40 for assisting transfer of the vials from wheel 57 to the conveyor blocks 65.

Details of the conveyor mechanism

Figure 10:
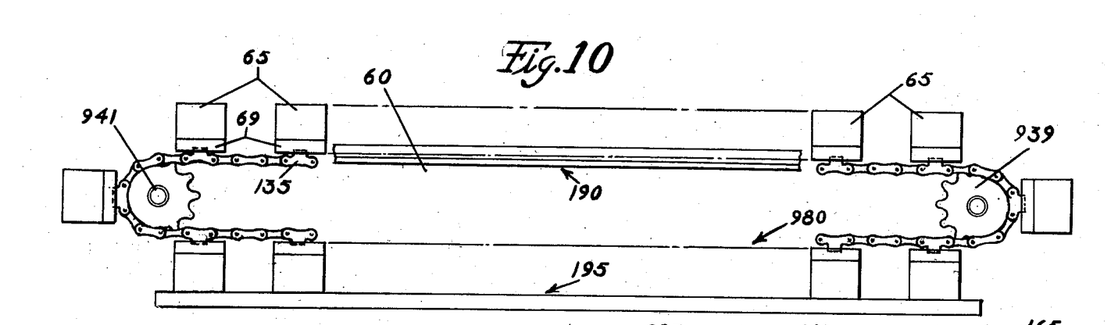
Fig. 10 is a fragmentary schematic view of the chain conveyor mechanism of the machine.
Figure 11:
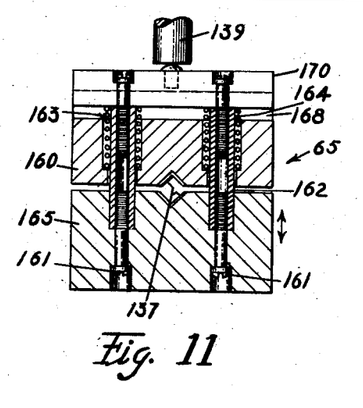
Fig. 11 is a sectional view showing the details of construction of the article supporting blocks of the conveyor.
Figure 12:
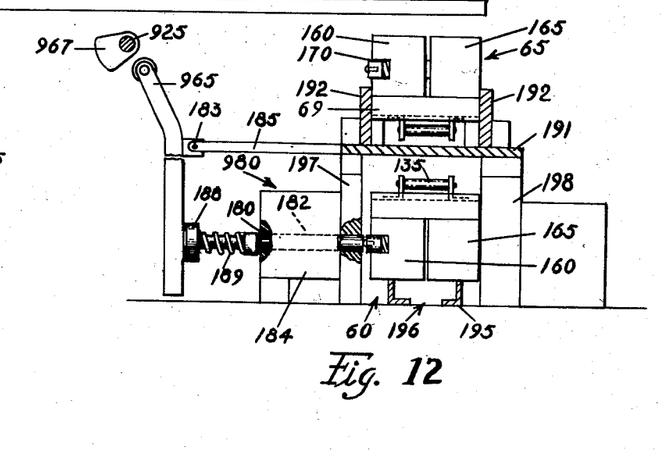
Fig. 12 is a schematic view illustrating the discharge mechanism of the machine.

Receipt of the vials from wheel 57 after insertion of the plunger stoppers is facilitated by the particular construction of the conveyor mechanism as illustrated in Figs. 10 to 12 inclusive of the drawings. As will be noted by reference to Fig. 10, the conveyor 60 comprises an endless chain 135 positioned to traverse a continuous path about a drive sprocket 939 and a spaced idler sprocket 941, the sprockets being supported in a conventional manner, not illustrated. The chain links 135 carry spaced plate members on which are mounted the vial supporting clamping blocks 65. A guide structure 190 is provided for the upper and main run of the conveyor while a further guide structure 195 is provided for the return run of the conveyor. The particular construction of the guide structures will be appreciated from an examination of Figs. 9 and 12 of the drawings in which the guideway 190 is shown as comprising a pair of spaced walls 192 supported on a plate 191 for the purpose of eliminating any sway in the line of blocks 65, and the guideway 195 is shown as comprising a pair of spaced runners providing a drop-out opening 196 centrally of the line of blocks. It will be understood that an identical structure is provided for conveyor line 60a.

As shown in Fig. 11, each clamp block 65 is formed of two mating and relatively movable sections 160, 165, the section 160 being fixedly connected with the supporting plate 69 on chain linkage 135. On the other hand, the section 165 is movably mounted on the support plate by means of a pair of bolt members 161 which project through counter-bored openings 163 in section 160 to a cross-bar member 170 slidably retained in a groove 168 in the side of section 160. Sleeve members 162 are mounted on the bolt members to facilitate easy relative movement between the sections. Normally, sections 160, 165 are maintained in close, clamping relationship by means of springs 164 which bear against the bar 170 and urge section 165 toward contact with section 160. Each section is also recessed as at 137 to provide a pocket for receiving and supporting a vial in an upstanding position, the upper edges of the pocket being beveled as shown to assist reception of the vial therein.

The mechanism for opening the blocks 65 as they register with the lowermost opening in vial wheel 57 is best illustrated in Fig. 5 of the drawing and comprises a reciprocable rod 139, 139a mounted for movement towards and away from the blocks in housing 40, 40a. A spring 148, 148a is positioned between housing 40 and a headed end on the rod to normally retain the rod in a retracted position.

Movement of rod 139, 139a to open the blocks for receiving the vials from the vial wheel is controlled by a crank like follower arm 147, 147a projecting in proximity with control shaft 925, 925a and pivotally mounted on housing 40 as at 146, 146a. With this arrangement a rocking of the follower arm 147 in clockwise direction, as viewed in Fig. 5, will press rod 139 against bar 170 to separate block sections 160, 165 for receiving a vial as it drops from wheel 57. As heretofore indicated the opening of the blocks is synchronized with the movement of the conveyor and vial wheel 57 in a predetermined manner through the common control shafts 925, 925a.

After the plungers have been inserted in the vials and the vials transferred to the conveyor, the conveyor transports them along a linear path during which further operations such as filling, sealing etc., may be performed without removal from the conveyor blocks. After completion of such further operation, or in the event such action is not desired, the vials can be rapidly and easily discharged at a point 980 on the return run of the conveyor. This vial discharge mechanism is illustrated in Fig. 12 of the drawings and comprises a plate or wall member 197 positioned on the inside of the conveyor track and supporting the upper guideway plate 191 and a centering block 184. A further pair of guide plates 198 (only one of which is illustrated in the figure) are positioned on the other side of conveyor 60 at a distance apart, axially of the conveyor, which is slightly greater than the length of a single block 65. The spacing between plates 198 is such that block section 165 can move laterally therebetween. As will be understood, walls 198 extend transversely of the conveyor for the purpose of stabilizing the movable block section 165 as the block is opened to discharge an assembled vial cartridge through the opening 196 between runners 195.

This discharging operation is accomplished by a structure which is similar to that provided for receiving the vials on the conveyor at the stopper-plunger insertion station and comprises a reciprocable rod 180 mounted to slide in a bore 182 in centering block 184. The ejector rod 180 carries a headed end 188, and a spring 189 is positioned between the block 184 and head 188 to normally urge rod 180 to a retracted, non-operative position. Head 188 in turn contacts the lower end of a follower arm 965 pivotally mounted on a bracket 185 as at 183. The arm 965 is rocked about pivot 183 by a cam 967 on control shaft 925. It will be understood that an identical arrangement is provided for conveyor line 60a.

The drive and control mechanisms

Figure 13:
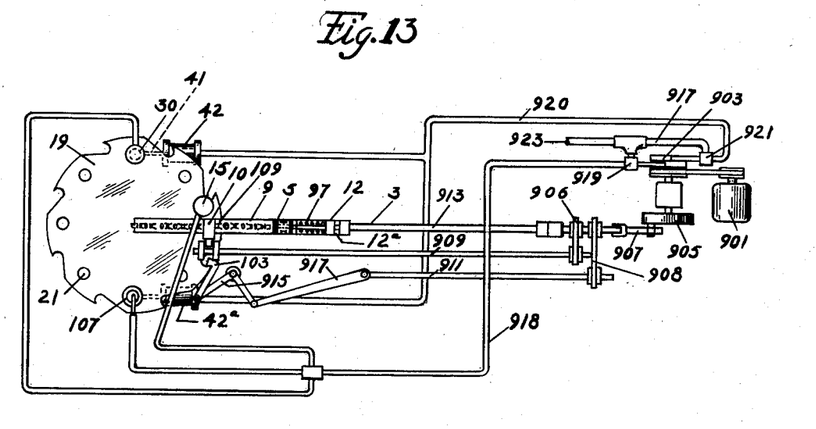
Fig. 13 is a schematic illustration of the drive and control mechanism for the plunger stopper feeding and orientation mechanism of the machine.

The various drive and control mechanisms for the above described machine are shown in Figs. 13 and 14, Fig. 13 being related to the upper portion of the machine and Fig. 14 to the lower portion. Referring to Fig. 13, 901 is a motor linked through a belt drive to an actuator shaft carrying cams 903 and a crank plate 905. Crank 905 is in turn linked through connecting rod 907 and arms 906, 908 to three rods, 913, 909 and 911, for the purpose of imparting reciprocating motion thereto. It will be recalled that rod 913 is employed to impart stepwise rotation to wheel 3 within plunger stopper hopper 1 for the purposes previously described, and to arm 12 and pawl 8 linking rod 913 to wheel 3, as shown in Fig. 3. It will also be recalled that the end of rod 913 is employed to eject plunger stoppers from chain conveyor 5 and transfer them into the radial pockets of vertical transfer wheel 9. Reciprocating rod 909 is connected to move arm 10 carrying pawl 10a by a collar 910 (see Fig. 2) for the purpose of imparting stepwise rotation to vertical transfer wheel 9. Finally, rod 911, through linkages 915, 917 imparts motion to pawl 103 to provide stepwise rotation of horizontal orientation wheel 19.

The pneumatic, servo-motor control and drive mechanisms associated with the previously described elements are operated from the cam mechanism 903 driven by motor 901. This cam mechanism actuates two valves, 919 and 921 through pivoted arms 26, 28 (see Fig. 3). The valves deliver compressed air from a main source of supply 923 to the pneumatic cylinders which actuate the various plungers previously described. Valve 919 delivers air to pneumatic cylinders 15, 30, and 107. Cylinder 15 actuates plunger 14 which ejects plungers from vertical transfer wheel 9; cylinder 30 actuates plunger 29 cooperating with blades 25 above horizontal orientation wheel 19; and cylinder 107 actuates yolk 75 which ejects plungers from both horizontal orientation wheel 19 and vertical inversion wheel 69. Valve 921 delivers air to pneumatic cylinders 42 and 42a, which in turn actuate plungers 41 and 41a, respectively, controlling the ejection of overflow stoppers within chutes 31 and 31a into receptacles 43, 43a (see Figs. 2, 3 and 5).

Fig. 14 shows the main drive and control mechanisms employed for operating the two assembly lines of the machine of this invention. Basically, it consists of two control and drive shafts 925 and 925a which are driven by a motor 927 through clutch devices 929 and 929a. Since both lines are identical, this description will be confined to the line operated by shaft 925. It can readily be seen that this shaft drives blocks 65 through bevel gears 931 and 933 and a ratchet and pawl drive mechanism 935 and 937, for the purpose of imparting stepwise rotation to drive sprocket 939, about which the chain conveyor 135 is engaged. An idler sprocket 941 engages the other end of chain conveyor 135 which carries blocks 65. The end of shaft 925 is provided with a crank plate 943 which reciprocates a linkage 945 connected to operate the star wheel 68 which indexes vials from vial hopper 59 and introduces them into vial chute 63. Another cam 947 operates the linkage 147 to the knockout bar 139 which is employed to open blocks 65 as they become situated beneath vial wheel 57 (see Fig. 5). As previously pointed out, vial wheel 57 and horizontal plunger stopper insertion wheel 49 are both operated from a common drive shaft 141. This shaft, as shown in Fig. 14, is driven from drive shaft 925 through bevel gears 949 and 951 and an intermittent drive device comprising a ratchet wheel 953 and a pivoted pawl operating lever 955. The lever 955 is connected to a crank unit 957 operated by gear 951. A cam is also connected to crank 957 and controls a valve 959 through a follower arm 958, which delivers compressed air from supply 923 to pneumatic cylinder 120 through line 926. As previously pointed out, cylinder 120 inserts the plunger stoppers into the vials contained in vial wheel 57. A further cam 961 operates a valve 963 through a follower arm 962 to deliver air from a line 928 through conduit 133 to head 131, which communicates with passages 129 leading to the base of radial pockets 55 in vial wheel 57. Upon insertion of the plunger stoppers into the vials, the vials may be removed from blocks 65 through the action of another linkage 965 reciprocated against blocks 65 by a cam 967 carried by drive shaft 925.

From the foregoing description, it should be apparent that the many reciprocating members or other mechanisms employed for transferring the plunger stoppers from one point in the machine to another, may be actuated by various pneumatic, electrical and/or mechanical means well known in the art. Further, it will be appreciated that various other modifications and equivalents may be employed without departing from the spirit of the invention, which is to be limited only by the scope of the appended claims.

What is claimed is:

1. A machine for orienting, feeding and inserting resilient plungers into cylindrical containers, said machine comprising a stationary frame, a hopper mounted upon said frame for storing a plurality of said plungers, a pick-up wheel rotatably mounted within said hopper and having peripheral pockets for receiving said plungers, said pick-up wheel passing through said stored plungers for abstracting them one at a time in random orientation within said pockets, a conveyor belt disposed about the periphery of said pick-up wheel, said conveyor belt having plunger receiving pockets which are spaced to correspond with the spacing between said pockets of said pick-up wheel and being associated with said pick-up wheel in a manner to cause said respective pockets to become successively aligned with each other, intermittent motion imparting means mounted upon said frame and operatively associated with said pick-up wheel for causing it to intermittently rotate, oscillating finger means operatively associated with said intermittent motion imparting means and constructed and arranged to pass through said pockets of said pick-up wheel when they are aligned with said conveyor belt pockets for insuring the passage of said plungers from said pick-up wheel pockets into said conveyor belt pockets, a transfer wheel rotatably mounted upon said frame including radially disposed plunger-receiving pockets in its edge, said transfer wheel being disposed in a position to cause its pockets to become successively positioned adjacent and aligned with the pockets in said conveyor belt, piston means disposed upon said frame adjacent the path of common travel of said aligned pockets of said transfer wheel and said conveyor belt for driving said resilient plungers from said conveyor belt into said transfer wheel, an orientation wheel having axially oriented plunger receiving pockets disposed about its periphery, said orientation wheel being rotatably mounted upon said frame in position to have the path of travel of its pockets intersect the path of travel of said pockets of said transfer wheel in aligned relationship for receiving said resilient plungers therefrom, individual piston means being respectively disposed to slide radially outwardly within each of said pockets of said transfer wheel for ejecting said plungers therefrom, piston actuating means mounted upon said frame adjacent said aligned position of said pockets of said transfer and orientation wheels and being operatively disposed with respect to the path of travel of said individual piston means for successively actuating each of said individual pistons as said pockets in said transfer and orientation wheels become successively aligned for successively driving said plungers from said transfer wheel into said orientation wheel, a stationary plate including a channel passing axially therethrough for allowing said resilient plungers to pass through said plate at a predetermined position, said plate being mounted upon said frame adjacent and parallel to said rotating orientation wheel in position to have said pockets in said orientation wheel successively lie over said channel, the depth of said pockets as terminated by the blank face of said plate being sufficiently great to completely receive the bodies of the plungers when they are oriented in one direction while permitting the bodies of the plungers oriented in the other direction to project therefrom, a pair of blades rigidly suspended upon said frame above said rotating orientation wheel, said blades being disposed on opposite sides of the succession of pockets in said orientation wheel when they are positioned above said channel for engaging said plungers projecting from said pockets as said plungers pass between said blades, lightly loaded piston means for urging plungers completely received within said pockets through said channel, said lightly loaded piston means being disposed in alignment with said successive pockets as they lie over said channel, said lightly loaded piston means being loaded insufficiently to dislodge said plungers projecting from said pockets and engaged by said blades to permit them to be carried by said pockets past said channel, a rotatable insertion wheel including radially disposed pockets in its edge and being rotatably mounted upon said frame, a container supply means mounted upon said frame, chute means connecting said supply means with the edge of said insertion wheel for feeding said cylindrical containers to said pockets, a positioning wheel being disposed over another portion of the edge of said insertion wheel for successively delivering said plungers to said containers in said pockets at a predetermined station, plunger delivering means connecting said channel with said positioning wheel for supplying plungers from said channel adjacent said orientation wheel to said vials in said positioning wheel pockets, inserting piston means disposed in line with said predetermined station for driving said plungers into said cylindrical containers, assembled plunger and container conveyor means disposed below said insertion wheel for receiving said plungered containers which are discharged therefrom, coordinated actuating and control means mounted upon said frame, and operating linkage means operatively associating said actuating and control means with each of the aforementioned means for driving them in coordinated relationship to carry out their appointed functions.

2. A machine as set forth in claim 1 wherein a second channel is provided in said plate in a position removed from said first channel in the direction of movement of said orientation wheel, and ejecting means are provided for discharging said plungers from said pockets when they are in a position overlying said second channel for delivery to a second positioning means.

3. A machine as set forth in claim 1 wherein the plane of said insertion wheel is vertically disposed and includes radial passages for receiving said containers, an annular depression in the face of said insertion wheel connecting with and exposing said passages near the base thereof, an inclined chute for feeding containers from a source thereof to the passages of said vertical wheel, a resilient member projecting within said annular depression and said radial passages as each said passage is rotated into alignment with said chute for cushioning the containers as they are successively delivered to each radial passage, means for inserting plungers into said containers, and an arcuate guard positioned about a part of the periphery of said vertical wheel to retain the plunger carrying containers within said wheel until discharged therefrom.

4. A machine as set forth in claim 3 wherein an extension is provided on said chute projecting along the face of said wheel and having a resilient tip member projecting within said annular depression and said radial passages as each said passage is rotated into alignment therewith, thereby cushioning the containers as they are successively delivered to each radial passage, means for inserting plungers into containers supported in said radial passages, an arcuate guard positioned adjacent to the wheel to retain the containers within said wheel for a predetermined number of radians and thereafter to permit gravity discharge of the vials from the wheel, and means for delivering a jet of compressed air to each said lateral passage after said wheel has progressed past its discharge point whereby broken and jammed containers can be ejected therefrom.

References Cited in the file of this patent
UNITED STATES PATENTS

| | | |
|---|---|---|
| 909,270 | Woodhead | Jan. 12, 1909 |
| 1,140,220 | Wein et al. | May 18, 1915 |
| 1,195,571 | Flaherty | Aug. 22, 1916 |
| 2,280,665 | Schmitter | Apr. 21, 1942 |
| 2,343,496 | Carroll | Mar. 7, 1944 |
| 2,360,158 | Parks | Oct. 10, 1944 |
| 2,627,108 | Kludt et al. | Feb. 3, 1953 |
| 2,698,478 | Heisterkamp | Jan. 4, 1955 |

UNITED STATES PATENT OFFICE
CERTIFICATE OF CORRECTION

Patent No. 2,824,361                                                        February 25, 1958

Frank E. Brown

It is hereby certified that error appears in the printed specification of the above numbered patent requiring correction and that the said Letters Patent should read as corrected below.

Column 3, line 37, for "wheel 18" read -- wheel 19 --; column 7, line 69, for "arm 133" read -- arm 962 --.

Signed and sealed this 13th day of January 1959.

(SEAL)
Attest:
KARL H. AXLINE
Attesting Officer

ROBERT C. WATSON
Commissioner of Patents